United States Patent

Grimes

[15] 3,647,229
[45] Mar. 7, 1972

[54] RESILIENT CONDUIT SEAL
[72] Inventor: Kenneth Grimes, Streetsboro, Ohio
[73] Assignee: Hamilton Kent Manufacturing Co., Kent, Ohio
[22] Filed: Feb. 12, 1970
[21] Appl. No.: 10,952

[52] U.S. Cl. .........................................................277/207
[51] Int. Cl. .............................................................F16j 15/10
[58] Field of Search.............277/205, 206, 207, 207 A, 208, 277/209, 210; 285/231, 230, 345

[56] References Cited

UNITED STATES PATENTS 2,615,740 10/1952 Nathan ...............................277/207 A
2,615,741 10/1952 Nathan ...............................277/207 A Primary Examiner—Herbert F. Ross
Assistant Examiner—Robert I. Smith
Attorney—Gordon C. Mack

[57] ABSTRACT

The seal is for use between the bell of one of two telescoped pipe ends and the spigot of the other pipe end. It is symmetrical and comprises a plurality of encircling perforate ears on its outer surface, with the tips of the ears in pressure contact with the inner surface of the bell. There is preferably a single tubular opening located radially inward from each tip and also a tubular opening near each edge of the seal below the above-mentioned openings. The inner surface of the conduit seal is preferably serrated and indented at the central portion.

11 Claims, 3 Drawing Figures

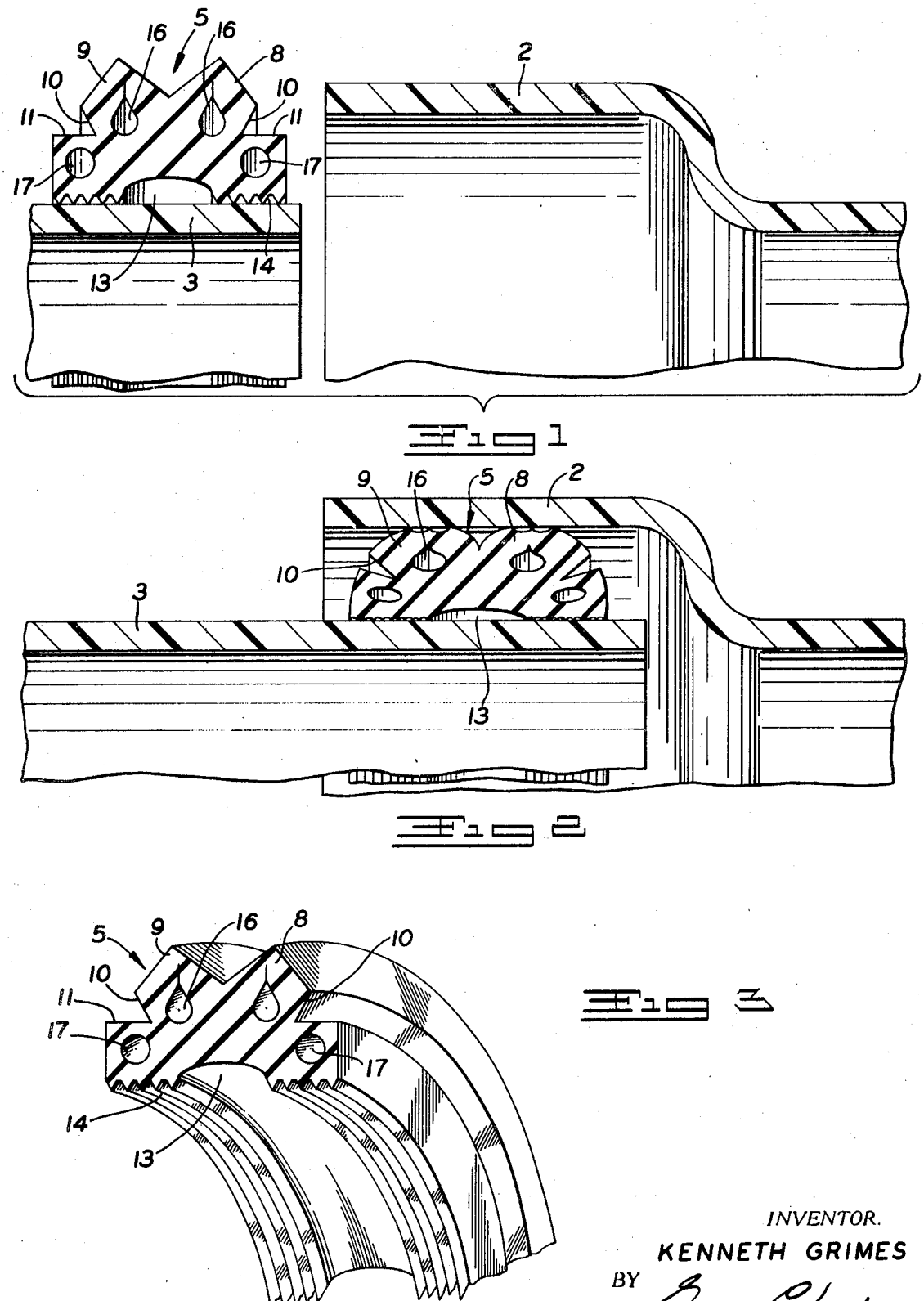

RESILIENT CONDUIT SEAL

The seal of this invention is for use between the bell of one pipe and the spigot of another pipe, the two pipe ends being telescoped. The seal is symmetrical and comprises a plurality—usually two—ears compressed against the inner surface of the bell of the one pipe, with a tubular opening through each ear; with the cylindrical inner surface of the seal in pressure contact with the spigot of the other pipe. Preferably there is also a tubular opening near each edge of the base portion of the seal. The invention includes the conduit seal; also two pipes with their ends telescoped in one another and the seal between the bell of the one pipe end and the spigot of the other pipe end.

The number of ears is usually limited to not more than four. Preferably there are but two ears. They may be rounded but are preferably pointed. They are so spaced from the spigot that when two pipes are joined, each ear will be compressed when in contact with the bell of the other pipe. The ears extend radially upwardly from a base portion. The outermost portions of the sides of this base portion extend laterally beyond the outermost portions of the ears. In the preferred conduit seal the portion of the base intersected by the perpendicular between the two ears is indented, preferably as an ellipse, such as a 20° ellipse, with its long axis in line with the base of the conduit seal. The areas of the base at the sides of the elliptical indentation are preferably serrated.

Each ear is preferably provided with a single tubular opening to give it resilience, and these are preferably tear-shaped with the points of the ears on the perpendicular axes of the openings. There are preferably also openings in the outer portions of the base—preferably a single tubular opening in each.

The conduit is broader than it is high so that it does not tend to roll when located between the spigot of one pipe end which is telescoped in the bell of another pipe end. There is sufficient friction between the bottom of the seal, particularly when it is serrated, to prevent slippage of the seal along the spigot when the pipe ends are telescoped.

The conduit seal is superior to those in which there is a single rounded contact between the spigot and the inner surface of the bell, even though there be ridges on the rounded surfaces. The ears each make a resilient sealing contact with the bell of a pipe. The conduit seal is symmetrical so that it can be installed by even the least skilled workmen.

The ears radiate from the center of the base and there are spaces between the outer surfaces of the two ears and the tops of those portions of the base which extend outwardly from the ears.

Thus, the elliptical or otherwise indented portion of the base, the various openings through the seal, and the spaces between the sides of the ears and the tops of the outwardly extending portions of the base assist in providing resilience to the conduit seal when compressed in use.

The invention is further described in connection with the accompanying drawings, in which:

FIG. 1 is an exploded view of a preferred form of the resilient conduit seal located on the spigot of one pipe, with this assembly being spaced from the bell of another pipe;

FIG. 2 shows the pipe ends telescoped with the seal compressed between them; and FIG. 3 is a perspective sectional view through the conduit seal.

One pipe is provided with a bell 2, and the other pipe is provided with a spigot 3 which is telescoped into the bell 2 when the pipes are joined. The conduit seal 5 is located on the spigot 3 before the pipes are telescoped. When they are telescoped the seal is compressed between them. There is little opportunity for the seal to roll along the spigot as the pipes are compressed because of the frictional contact between the base of the conduit seal and the spigot.

The seal comprises two tipped ears 8 and 9. The sides of the ears are shown as flat, but they may be rounded. The outer surfaces 10 of the two ears are spaced from the tops 11 of the outer edges of the base portion. The elliptical opening 13 is located at the middle of the base and the conduit seal is symmetrical. There may be several indentations instead of a single central indentation. The inner surface of the base is serrated at 14.

The resilience of the gasket material is enhanced by providing tubular openings 16, preferably teardrop shaped, in the ears with the points of the teardrops on lines perpendicular to the base or outer surface of the spigot. In the portions of the base which extend beyond the union of the ears with the base there are circular openings 17 which also give resilience to the gasket.

In FIG. 2 the gasket is illustrated as compressed between the spigot and bell of two pipes. The tips of the ears make contact with the inner surface of the bell, and as these are compressed the sides of the ears also make contact, but only if the tops of the ears are not rounded. In any event, the conduit seal makes a plurality of sealing contacts with the inner surface of the bell. It will be noted that even under compression, the sides 10 of the ears do not contact the tops 11 of the base portion of the gasket. Under compression, the ellipse is flattened, adding resilience to the naturally resilient composition of the gasket.

Thus the conduit seal is preferred to nonsymmetrical seals and to seals which provide only a single line of contact between the outermost portion of a gasket and the bell of a pipe.

I claim:

1. A resilient cylindrical conduit seal for use between the bell of one pipe and the spigot of another pipe, said seal in the cross section having opposite halves which are symmetrical to each other, said seal comprises a base portion with sufficient substantially cylindrical surface to make sealing contact with a pipe spigot, the bottom of the seal is indented at its central portion to give resilience to the seal when under compression, and radiating outwardly from said base portion a plurality of ears, each with a tip which is spaced perpendicularly from the base a distance sufficiently greater than the distance between the outer surface of the spigot and the inner surface of the bell to be adapted to make sealing contact with the inner surface of the bell when the seal is compressed between said spigot and bell, an opening through each ear to add resilience to the conduit seal when under compression, the base portion extending outwardly on both sides of the conduit seal beyond the union of the ears with the base portion, with the tops of said outwardly extending base portions spaced from the ears.

2. The conduit seal of claim 1 in which there are only two tips and these are pointed.

3. The conduit seal of claim 2 in which the indented portion is elliptical with its greater axis substantially in line with the base.

4. The conduit seal of claim 2 in which the areas of the bottom of the base outside of the indentation are serrated.

5. The conduit seal of claim 2 in which there is a single opening in each ear the shape of a teardrop with the pointed portion of the opening pointing substantially perpendicularly away from the base.

6. The conduit seal of claim 2 in which there is an opening through each part of the base portion which extends beyond the union of the ears with the base portion.

7. Two pipes with a spigot on one within a bell on the other and a conduit seal of claim 1 compressed in sealing contact with the inner surface of said bell and the outer surface of said spigot.

8. Two pipes with a spigot on one within a bell on the other and a conduit seal of claim 2 compressed in sealing contact with the inner surface of said bell and the outer surface of said spigot.

9. Two pipes with a spigot on one within a bell on the other and a conduit seal of claim 3 compressed in sealing contact with the inner surface of said bell and the outer surface of said spigot.

10. Two pipes with a spigot on one within a bell on the other and a conduit seal of claim 4 compressed in sealing contact with the inner surface of said bell and the outer surface of said spigot.

11. Two pipes with a spigot on one within a bell on the other and a conduit seal of claim 5 compressed in sealing contact with the inner surface of said bell and the outer surface of said spigot.

* * * * *